July 22, 1958 J. S. BRYAN 2,844,759

APPARATUS AND METHOD FOR OVERCOMING SCANNING ERROR EFFECTS IN PLURAL BEAM CATHODE RAY TUBES

Filed July 18, 1955 3 Sheets-Sheet 1

INVENTOR.
JAMES S. BRYAN
BY
Allen V. Hazeltine
ATTORNEY

July 22, 1958 J. S. BRYAN 2,844,759
APPARATUS AND METHOD FOR OVERCOMING SCANNING
ERROR EFFECTS IN PLURAL BEAM
CATHODE RAY TUBES
Filed July 18, 1955 3 Sheets-Sheet 2

(CURRENT FLOWING TOWARD OBSERVER) (CURRENT FLOWING TOWARD OBSERVER)

INVENTOR.
JAMES S. BRYAN
BY
[signature]
ATTORNEY

July 22, 1958 J. S. BRYAN 2,844,759

APPARATUS AND METHOD FOR OVERCOMING SCANNING ERROR EFFECTS IN PLURAL BEAM CATHODE RAY TUBES

Filed July 18, 1955 3 Sheets-Sheet 3

INVENTOR.
JAMES S. BRYAN
BY
[signature]
ATTORNEY

United States Patent Office 2,844,759

Patented July 22, 1958

2,844,759

APPARATUS AND METHOD FOR OVERCOMING SCANNING ERROR EFFECTS IN PLURAL BEAM CATHODE RAY TUBES

James S. Bryan, Philadelphia, Pa., assignor to Philco Corporation, Philadelphia, Pa., a corporation of Pennsylvania Application July 18, 1955, Serial No. 522,648

10 Claims. (Cl. 315—27)

This invention relates to improvements in cathode ray tube systems and in particular to a system for overcoming the effects of a certain type of distortion which arises in an electromagnetically deflected cathode ray tube in which a plurality of electron beams are produced.

While not limited thereto, my invention is particularly applicable to certain forms of cathode ray tubes suitable for use as the image reproducing devices of color television receivers, and it is with reference to this application that the invention will be described. Such cathode ray tubes may comprise an image-forming beam intercepting structure constituted in part of a screen having a plurality of groups of parallel strips of phosphor materials, each of which emits light of a particular primary color when bombarded by an electron beam. Between the phosphor strips and the electron gun a plurality of indexing elements may be disposed so that a predetermined geometrical relation exists between each of the elements and a corresponding one (or ones) of the phosphor strips. These indexing elements may consist of strips of a material having a secondary emission characteristic differing from that of the phosphor screen. Two electron beams are generated within the tube which are very close to one another, and which are deflected in unison by an electromagnetic deflection yoke. One of the electron beams (hereinafter called the "video beam") is modulated in intensity by video signals corresponding to the color components of a televised scene and is caused to scan in a direction transverse to the phosphor strips in a plurality of substantially parallel paths, thereby producing a luminous multi-colored image corresponding to the original scene. The other electron beam (hereinafter called the "indexing beam") is caused to impinge upon the indexing elements in step with the impingement of the video beam on the phosphor screen. The indexing beam causes indexing signals to be produced as a result of the emission of secondary electrons from the indexing elements in response to the impingement thereupon of the indexing beam. These indexing signals may be used to coordinate the position on the phosphor screen of the video beam with the modulation of the latter, so that when the video beam strikes a red color-emissive phosphor strip, for example, its intensity will be modulated by a video signal whose amplitude corresponds to the red color content of the scanned element of the televised scene. However, it may be difficult to realize this objective because of a number of distortions inherent in plural beam cathode ray tubes which employ electromagnetic deflection yokes. To insure precise coordination between impingement of the video beam on the different colored light-emissive strips and the modulation of the beam in accordance with intelligence representative of these colors, it may be desirable for both the video beam and the indexing beam to traverse simultaneously the same phosphor strip at all points of the scanning raster although the beams may be displaced from each other slightly in the direction of the phosphor strips.

One type of distortion which is found to exist in plural beam color television cathode ray tubes which are electromagnetically deflected is known as "corner twist" error. Corner twist error is manifested by a change in the relative angular positions of the video and indexing beams at various points on the raster, but especially at the four corners thereof. At the upper left and right hand corners of the raster the spot produced by the video beam is closer to the corresponding edge of the raster than the spot of the indexing beam. However, at the lower left and right corners the converse is true, i. e., the indexing beam spot is closer to the corresponding edges of the raster than the video beam spot. At other points on the raster there is a varying angular displacement between the two spots, the amount of displacement increasing as a function of the distance from the vertical axis and from the horizontal axis of the raster. If the phosphor strips are rectilinear it is possible, because of corner twist error, that at one point on the screen the indexing beam will impinge on a blue emissive strip while the video beam will impinge on the red emissive strip adjacent thereto. At another point on the screen the indexing beam may impinge on a green emissive strip while the video beam impinges on a red emissive strip. Hence, the indexing signals generated by the indexing beam will not accurately indicate the position of the video beam, making it very difficult to coordinate the position of the video beam with the intensity modulation of the latter. As a result the quality of the reproduced image will be noticeably degraded.

Corner twist error is a function of the separation of the centers of the two beams as they pass through the deflection yoke, and is also a function of the distribution of the windings in the yoke. Since the distribution of the windings varies from one yoke to another of the same general class, the degree and direction of the particular corner twist error produced by each yoke will be affected accordingly unless narrow tolerances are specified and maintained during their manufacture which would increase the cost of yokes considerably. On the other hand, if narrow tolerances are not maintained, the distribution of the windings will vary from yoke to yoke, and extensive and delicate adjustments will be required to position the yoke at precisely the right place for each cathode ray tube during the manufacture of receivers employing such yokes. As a consequence, many costly man-hours will be expended to the detriment of efficient production.

It is therefore a principle object of this invention to provide a system whereby the electron beams of a plural beam cathode ray tube are caused to track in a predetermined manner during the scanning of a beam-intercepting structure located in said tube.

Another object of the invention is to provide a beam-intercepting screen which assists in overcoming the effects of corner-twist error in plural beam cathode ray tubes.

Still another object of the invention is to provide a system for use with plural-beam cathode ray tubes to overcome the effects of corner-twist error so that manufacturing specifications for deflection yokes therefor may be relaxed.

Another aim of the invention is to provide a method of and means for overcoming the effects of corner-twist error in plural-beam cathode ray tube, which is effective despite variations in the distribution of the windings in the deflection yokes therefor.

Another object of the invention is to provide a system for improving the color fidelity of images produced by certain types of color television receivers.

The construction of apparatus and formulation of methods to achieve these objectives, as well as others which will appear, is predicated on the assumption that it is impractical to attempt to eliminate totally corner twist error in plural beam cathode ray tubes of the type described. It is based on the discovery that, if the center of the deflection yoke, as defined hereinafter, coincides with the region in which the beams cross one another, changes in the distribution of the windings of the yoke do not cause variations in the corner twist scanning pattern. It then is possible to design a screen whose elements are so arranged that the beams track whenever they impinge on the elements during scanning, thus improving the fidelity of the reproduced image.

I have also devised, as another feature of my invention, a simple procedure to facilitate the establishment of the proper relation between the crossover region of the beams and the center of the yoke. This is accomplished by feeding signals in opposite polarities to the two halves of one of the windings of the yoke and adjusting the positions of the crossover region and the yoke center with respect to one another until the area of both beam spots is at a minimum.

Figures 1, 2, 3A, 3B:
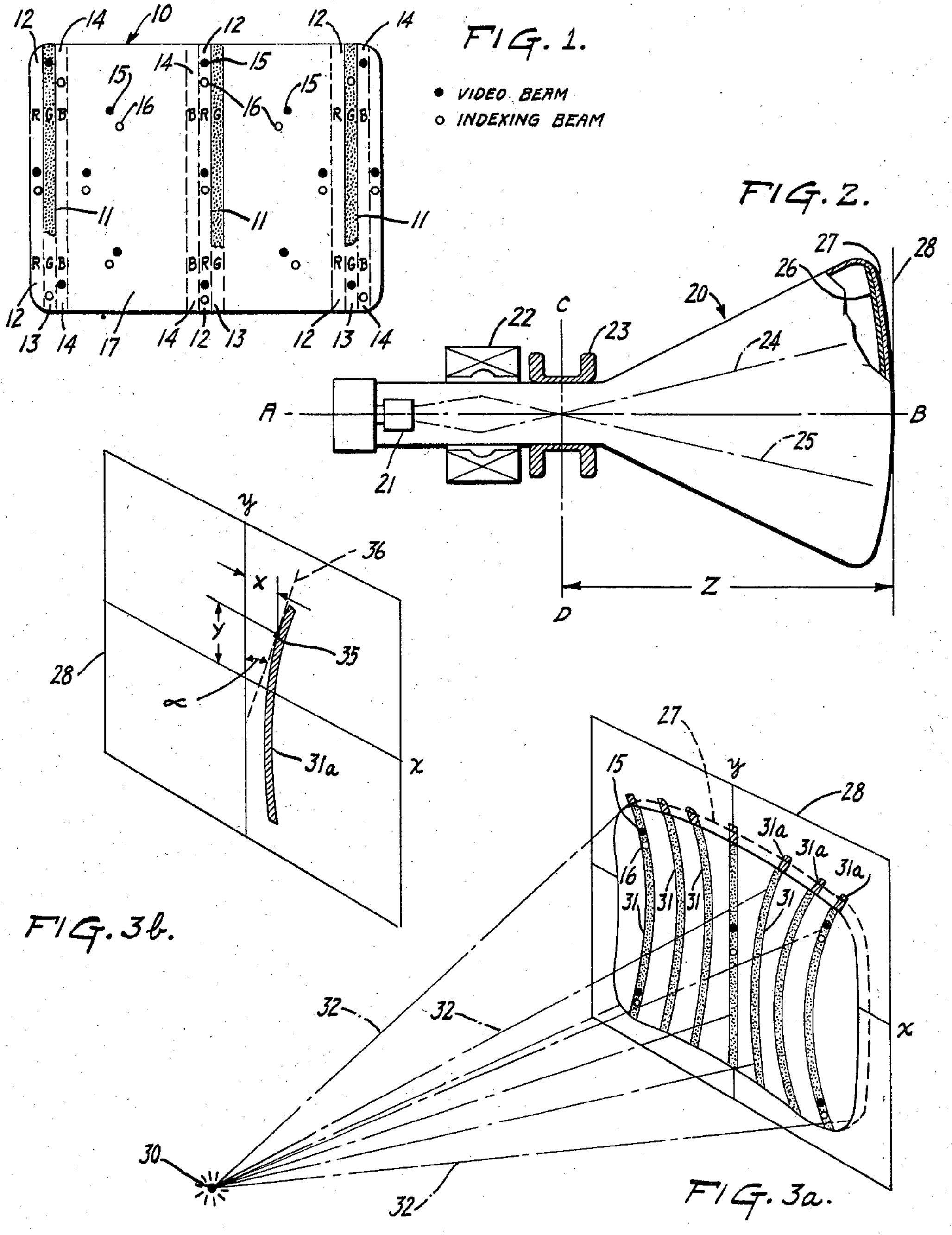
Figure 1 shows schematically the distortion known as corner twist error in a color television reproducing tube having a number of parallel phosphor strips.
Figure 2 is a schematic representation of a cathode ray tube assembly for producing a controlled and reproducible corner twist error scanning pattern.
Figure 4:
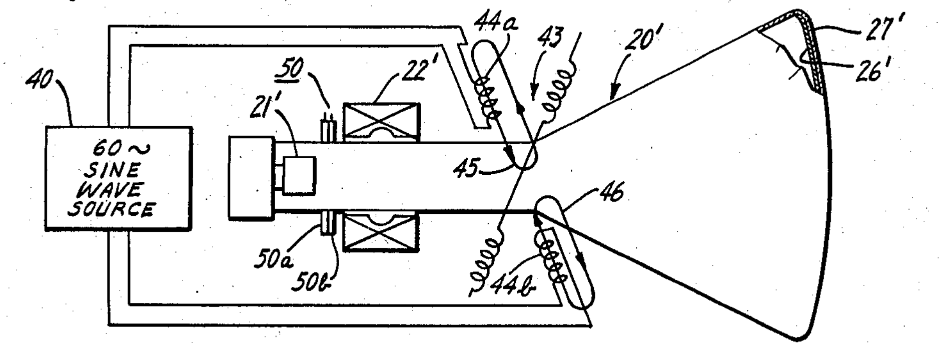
Figure 5A:
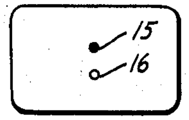
Figure 5B:
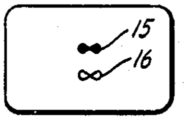
Figure 5C:
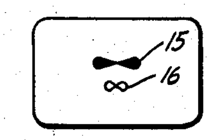
Figure 5D:
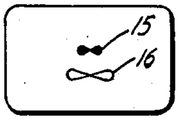
Figures 6A, 6B:
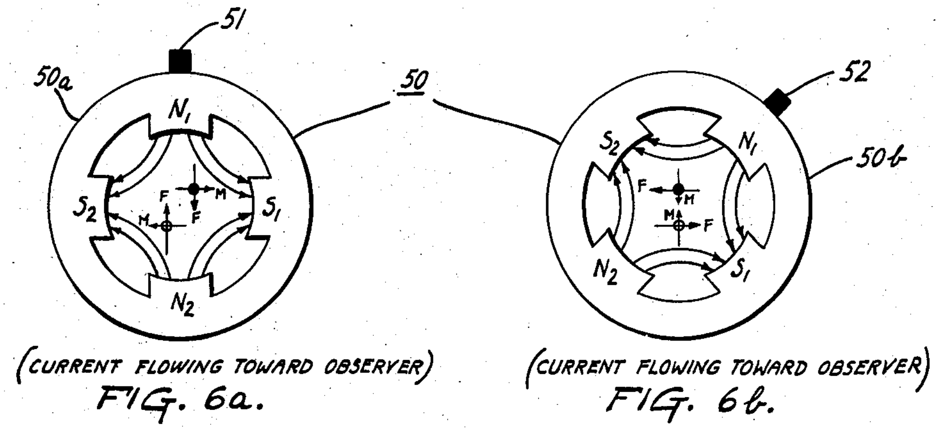
Figure 7A:
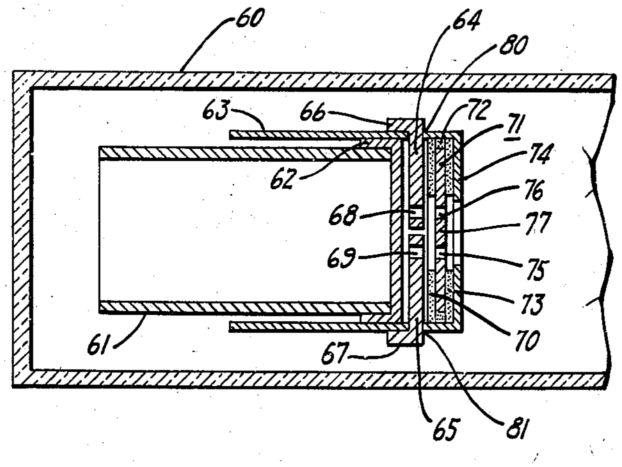
Figure 7B:
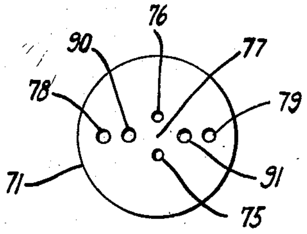

Figures 3*a* and 3*b* schematically show an appropriate screen structure for use with the apparatus of Figure 2 illustrating how the elements of the screen structure are arranged;

Figure 4 is a schematic representation of a system and apparatus for ascertaining when the center of the yoke is properly aligned with the region in which the beams cross over;

Figures 5*a*, 5*b*, 5*c*, and 5*d* are representations of various beam spots obtained in aligning the beam crossover region with the center of the yoke using the apparatus of Figure 4;

Figures 6*a* and 6*b* are schematic representations of the two parts of a skew and convergence corrector which may be used with the tube shown in Fig. 2 to vary the position of the beam crossover region; and Figures 7*a* and 7*b* are two views of an electrode that may be employed within the cathode ray tube shown in Figure 2 to effect variations in the position of the crossover region of the two beams thereof.

Referring now to Fig. 1, there is represented the beam intercepting screen 10 of a color television image reproducing tube as seen from the electron gun. The screen 10 contains a number of rectilinear phosphor strips 12, 13 and 14 disposed in groups of three on the inner surface of the faceplate of the tube (or on a separate planar and transparent member) in a recurrent sequence from left to right. Each group of three juxtaposed strips will contain strips which may respectively emit light of three additive primary colors, for example. A light-reflecting and electron-permeable aluminum coating 17 is deposited on the back of strips 12, 13, and 14 to enhance the brightness of the image. The strips 12, 13 and 14 are represented by the spaces between the dashed vertical lines, and are lettered to denote the color of the light emitted. Although only three sets of strips are shown, one at the left hand side of the screen 10, another at the right hand side of the screen 10 and a third at the center of the screen 10, it should be understood that these strips are arranged in groups in a continuous recurrent sequence across the entire inner surface of the faceplate of the tube.

In order to coordinate the position of the video beam with the modulation of its intensity, a number of elements 11 of a secondary-electron emissive material such as MgO may be deposited on the aluminum coating 17. Each of these indexing elements 11 may be in the form of a strip which is so placed on the coating 17 that it coincides with one of the strips 12, 13 and 14. In Figure 1, a typical placement of the indexing strips 11 over corresponding green light emissive phosphor strips 13 is shown.

The area of impingement of the video beam on the screen is indicated in Fig. 1 by the filled-in circle 15, whereas that of the "indexing" beam is indicated by the unfilled circle 16. The respective areas of impingement 15 and 16 of the video and indexing beams are shown in Figure 1 at various places on the beam intercepting screen 10. If the indexing beam is to provide the proper information to coordinate the position of the video beam with the intensity modulation of the latter, it should impinge on the same phosphor strip as does the video beam at all points on the screen. Instead, as inspection of Fig. 1 reveals, the area of impingement 16 of the indexing beam varies in position with respect to the area 15 of the video beam at a number of places over the beam intercepting screen 10. For example, at the upper left hand corner the video beam impinges on the indexing element 11 (and hence on the green emissive phosphor strip 13 coincident therewith) whereas the indexing beam impinges on the blue emissive phosphor strip 14. In the upper central portion of the screen the video beam impinges upon a blue strip 14 while the indexing beam impinges upon an indexing element 11 (and hence upon the green emissive strip coincident therewith).

In the lower half of the screen the opposite condition prevails, that is, at the lower left hand corner the indexing beam impinges upon the indexing element 11 (and upon the green phosphor strip coincident therewith) at a time when the video beam impinges upon the blue emissive phosphor strip 14. However, at the lower right hand corner, the indexing beam impinges upon the blue emissive strip 14 and the video beam impinges upon the indexing element 11 and its associated green phosphor strip 13. The displacement between the two beams increases the farther the beams scan from the center of the screen.

In the absence of the proper relation between the positions of the beams at all points on a beam-intercepting screen having parallel rectilinear elements as shown in Fig. 1, or of any special compensating screen whose elements are disposed to take corner twist error into account, the effectiveness of the control system to coordinate beam position with beam modulation is considerably diminished. This is because an indexing signal may be produced when the video beam impinges on a red or a blue phosphor strip, as well as when it impinges on a green strip. Moreover, since it is very difficult to eliminate completely corner twist error, except by maintaining very rigid specifications in the manufacture of deflection yokes, a more desirable and practical alternative would be to devise a system in which the corner-twist error does not vary with changes in the distribution of the windings of the yoke. As a result, the elements of the screen can be arranged in such a way that, given the unvarying pattern of corner twist error, the two beams nevertheless track at all points, thus helping to prevent the malfunction of the indexing system. Since the indexing system would then work properly, the fidelity of the reproduced image would be improved.

I have found that if the beams of a plural beam cathode ray tube cross over one another in the center of the yoke as defined herein, variations in the windings of the yoke will not affect the corner twist error pattern.

By "center of the yoke" I means that point in the space surrounded by the yoke in which there is substantially no change in the magnetic field strength for a minute displacement therefrom in any direction.

In Fig. 2 a double beam cathode ray tube system is shown in which the crossover region of the two beams is coincident with the center of the deflection yoke associated therewith. A cathode ray tube 20 is shown which has an electron gun structure 21, a focussing magnet 22, and a deflection yoke 23. The electron gun 21 produces a video beam 24 and an indexing beam 25, both of which are indicated by broken lines. The focussing magnet 22 is so constructed that it produces a magnetic field, most of whose lines of force are substantially parallel to the longitudinal axis AB of the tube 20. This magnetic field is part of the electron-optical system which exerts an influence on the position of the crossover region of the two beams and also upon the size of the "spots" of the two beams, i. e., the respective areas of impingement of the beams on the screen 10 of the tube. The beams 24 and 25 cross over at a point through which the vertical broken line CD is drawn. Line CD also passes through the center of the deflection yoke 23.

In general, the center of the deflection yoke (sometimes referred to herein as "center of the yoke" or "yoke center") will coincide substantially with the geometric center of the yoke, if the yoke is symmetrical. The geometric center of the yoke lies on the longitudinal axis of the yoke midway between the front and back ends thereof. At this point there is substantially no change in the magnetic field strength with respect to displacement therefrom. If the yoke is not symmetrical but is flared, for example, the center of the yoke will not be coincident with the geometric center, since the point on the longitudinal axis at which there is substantially no change in the magnetic field strength with respect to displacement will be closer to the back end (i. e., closer to the electron gun) than to the front end. In practice, the location of the center of any yoke may be found indirectly by the method of alignment of the cathode ray tube hereinafter described in connection with Figs. 4, 5*a*, 5*b*, 5*c* and 5*d*.

Since the crossover region of the beams 24 and 25 coincides with the yoke center, the beams 24 and 25 will traverse the beam intercepting screen 26 in a scanning pattern which is independent of the distribution of the windings of the yoke. If the yoke 23 is removed and a yoke of the same general class but with a different distribution of the windings is substituted therefor, the scanning pattern on the screen 26 will nevertheless remain approximately the same. The elements on the screen 26 may therefore be arranged to conform to the scanning pattern so that the two beams will track at all points thereon. For illustration purposes, the points at which the beams 24 and 25 impinge on the screen 26 are shown displaced by a large amount, although in reality their separation may be about 115 mills.

The construction of the screen 26, which can easily by fabricated in quantity because the scanning pattern produced by aligning the crossover region with the yoke center does not vary with variations in the distribution of the windings of the yoke, will now be considered with reference to Figures 3*a* and 3*b*. The beam intercepting screen 26 is seen to comprise a number of electron-impingement-responsive elements which may be, for example, strips of phosphors emissive of three primary colors, for example. These elements 31 are deposited on the inside surface of the faceplate 27 of the cathode ray tube 20 shown in Fig. 2. A plane of projection 28 is shown which is tangent to the center of the screen 26. In Fig. 3*a* the relative displacements between the beams 24 and 25 in their scanning pattern at various points on the screen 26 are shown by their areas of impingement 15 and 16. It is seen that in the corners, where their mutual displacement is greatest, they nevertheless fall upon the same one of the elements 31.

From a center of projection 30 rays 32 emanate which intersect the screen 26 and the plane 28, thereby producing projections 31*a* of each of the elements 31 on the plane 28. The projection 31*a* of any given one of the elements 31, as for example, of the first element 31 to the right of the central vertical axis Y, is shown in Fig. 3*b*.

It is more useful and practical to specify the arrangement of the elements 31 in terms of their projections upon the tangent plane 28 than in terms of their arrangement on the faceplate 27 since it is possible to derive from the projections the appropriate arrangement for elements 31 on a faceplate having any given degree of curvature. The angle made by a line 36, tangent to any projection 31*a* at any point 35 as shown in Fig. 3*b*, and the central vertical axis *y* can be substantially determined by the formula which follows:

$$\alpha=\frac{1.11}{Z^2}XY$$

in which $\alpha$ is the angle in radians formed between the tangent to any projection at any point and the vertical axis *y*, in which X is the distance in inches measured normal to the *y* axis of said point from said axis, in which Y is the distance in inches measured parallel to the *y* axis of said point from the X axis, and in which Z is the distance in inches from the center of projection to the point of the screen 26 at which the plane 28 is tangent. The distance Z will also coincide with the distance from the yoke center when the latter and the crossover region are properly aligned as shown in Fig. 2.

In order to realize the advantages of my invention, it is, of course, essential that the yoke center be coincident with the beam crossover region. It is possible to arrive at the approximate location of the beam crossover region, assuming a fixed position for the focussing magnet, by a tracing of electron rays if data such as the distance between the centers of the spots of the undeflected beams on the tube face and the position of the virtual crossover region of the individual rays of each beam with respect to anode space and the position of the focussing magnet are known. However, since there is a good deal of uncertainty about the position of this virtual crossover region, the accuracy of this method of determining the crossover region of the beams is very questionable. Besides, the ray tracing method is time-consuming and is not readily adaptable to the manufacture of color television cathode ray tube assemblies of the type involved herein.

As a corollary feature of the present invention I have devised a simple apparatus shown in Figure 4 and a rapid method for ascertaining when the beam crossover region of such cathode ray tubes coincides with the center of the yoke. A deflection yoke 43, similar to ones which are to be used with the cathode ray tube 20′, is situated on the neck portion of the tube 20′ near the bulb part thereof. An electron gun 21′ produces two beams which pass through a substantially axial magnetic field produced by the focussing magnet 22′. The beams are then deflected by the yoke 43 to scan a pattern of paths across the screen 26 on the face plate 27′. The yoke 43, however, has some constructional characteristics which differ from those of conventional deflection yokes. Either, but not both, of the windings (i. e., either the vertical or horizontal windings) are energized by signals from a source of oscillatory currents such as the 60 cycle sine wave source 40 illustrated. The half winding 44*a* of the horizontal section, for example, is connected to the source 40 so that a magnetic field is produced, one line of force being shown at number 45. The other half winding 44*b* of the horizontal section of the yoke 43 is connected oppositely to the source 40. Half winding 44*b* is therefore energized oppositely and its magnetic field (a typical line of force of which is indicated at number 46) tends to cancel, in the paraxial region of the tube, the magnetic field produced by the half winding 44*a*.

If the yoke center and the beam crossover region coincide, the spots of the beams on the screen 26′ will have a distinctively small and undistorted appearance. If the beam spots on the screen 26′ do not exhibit this distinctive appearance, the operator can, by observing the particular configuration produced thereon, interpret whether the distortion is due to skew of the beams, to the crossover of the beams at a point other than yoke center, or to some other factor.

In Figures *5a, 5b, 5c* and *5d* various beam spot configurations are shown as viewed on screen 26' through faceplate 27'. In Fig. *5a* the areas of impingement of the video and indexing beams are shown when the deflection yoke 43 is properly aligned vertically and horizontally, when there is no skew error in the beams, and when the beams cross over at the yoke center region. In Fig. *5b*, the equally long parallel "bow tie" configurations of the respective beam spots are due to the fact that the deflection yoke is either too far up or too far down, there being no skew error or error in the region in which the beams cross over. In Fig. *5c*, the two bow tie configurations of different length indicate that the yoke is not properly positioned in a vertical direction and that the beams do not cross over at the proper point. In Fig. *5d*, the bow tie configuration of the video beam impingement area 15 is shorter than the indexing beam bow tie configuration because of improper vertical placement of the yoke and either an improper crossover point position or improper focussing magnet position or both. If there is skew in the relation of the beam centers, along with the distortions shown in Figs. *5b, 5c* and *5d*, the resultant bow tie configurations (not shown) will not be parallel to one another.

In using the apparatus shown in Fig. 4 it should be noted that there are several ways in which the beam crossover region and the center of the yoke may be made to coincide. Either the crossover region may be varied with respect to the yoke center position, or the yoke center position may be varied with respect to the crossover region, or the positions of both may be varied.

The position of the yoke, and hence of the yoke center, may, of course, be altered by moving the yoke longitudinally on the tube until, by observing the resulting beam spots on the screen, it is determined that its center coincides with the convergence region. However, if the yoke is moved too far in the direction of the electron gun, the electron beams may be partially blocked by the area of the tube at which the neck portion is joined to the bulb portion thereof, resulting in the phenomenon known as "neck shadow." Consequently it is preferable to place the yoke as far forward along the longitudinal axis of the tube as possible to minimize this possibility.

There are also several ways to vary the position of the beam crossover region along the longitudinal axis. One way is to shift the position of the focussing magnet 22' along the longitudinal axis of the tube 20'. While this method is simple, it results in variations in the focus of the beam spots on the screen 26', and is therefore not well suited for cathode ray tubes used in commercial color television receivers of the type hereinbefore described since it has been found that there is an optimum size for such beam spots.

Another way of aligning the crossover region with yoke center is by the use of a so-called "skew and convergence corrector" such as shown in Figures *6a* and *6b*. "Skew" is considered herein to mean that the centers of the beams, as they enter the deflection field, do not lie within the same plane. "Convergence" refers to the tendency of the beams to cross over one another. The skew and convergence corrector, as its name suggests, performs a dual function. First, it can be adjusted to vary the positions of the beam centers in the grid-anode acceleration gap so that they lie within the same plane, i. e., so that they are not skewed. Second, it can be adjusted to increase or decrease the angle that the beams form (assuming their centers lie in the same plane) with respect to the longitudinal axis as they leave the gun, this angle determining, in part, the position of the crossover region.

The skew and convergence corrector 50 consists of two thin notched annular members 50a and 50b which are placed in close contact with one another so that they are substantially in the same plane near the electron gun

21 in the position shown in Fig. 4. Each of the members 50a and 50b has two pairs of coaxially located poles ($N_1$—$N_2$, $S_1$—$S_2$) disposed at right angles to one another. The members 50a and 50b have respective tabs 51 and 52 by means of which they can be rotated clockwise or counterclockwise. In Figs. *6a* and *6b* some of the lines of magnetic force are drawn in to show their effect on the beams whose positions within the fields created by the members 6a and 6b are represented in the same fashion as hereinbefore.

To illustrate the action of the skew and convergence corrector 50 it is assumed that the current is flowing out of the page in Figs. *6a* and *6b*. The letter M signifies the direction of the motion imparted to the beam in response to the magnetic field, and the letter F signifies the direction of the lines of force acting on the beam. It is further assumed that the center of the video beam is skewed to the right with respect to the center of the indexing beam as shown in Fig. *6a*. If member 50a is rotated 90° in a counter-clockwise direction so that the pole $N_1$ is positioned where the pole $S_2$ formerly was, the lines of force acting upon the video beam will extend upwards. Applying the left hand rule, the video beam will therefore be urged toward the left. Conversely, the lines of force acting on the indexing beam will extend downward in the adjusted position of member 50a so that the indexing beam is urged toward the right. The extent to which the video and indexing beams are urged to the left and to right respectively will be determined by the extent of the skew error to be corrected. Once the two beam centers are in the same plane, i. e., are not skewed, the annular member 50b may be rotated to adjust the position of the region in which the beams cross over. In the position shown in Fig. *6b* the video and indexing beams are being urged toward each other by the fields created so that they will cross over at a point relatively close to the electron gun. If it is desired to adjust their point of crossover to a position further from the electron gun, the member 50b may be rotated clockwise 90° until pole $N_2$ is where $S_2$ formerly was. As adjusted, the lines of force in the region of the video beam will extend from left to right so that the motion of the beam is upward, whereas the lines of force in the region of the indexing beam will extend from right to left causing the indexing beam to be urged downward.

The skew and convergence corrector 50 acts as an entity, i. e., to correct skew or change the position of the region in which the beams cross over to the desired degree it is necessary to adjust both members 50a and 50b since they are interdependent, a change in one member affecting the beams in such a way that a change in the other member is required. It should be noted that as the member 50b is rotated clockwise from 0° to 90°, the respective beams are caused to move in semi-circular clockwise paths such that, at 45° rotation, the video beam is higher and to the left of its starting position whereas the indexing beam is lower and to the right of its starting position. From 45° to 90° the video beam moves higher and returns once more toward the right until, at 90°, it is directly above its starting position. Converseley, the indexing beam, beginning at 45°, moves further down and starts to return to the left until, at 90°, it is directly below its starting position. Thus it is seen that the member 50b imparts a horizontal as well as a vertical movement to the respective beams. This is also true of the member 50a which, in correcting for skew, may introduce a vertical displacement component into the respective beams. In employing this apparatus it is therefore necessary to move both members in order to arrive at the desired mutual beam position.

The skew and convergence correcor just described is essentially a two part device for producing two four-poled permanent magnetic fields whose intensity and direction can be varied by rotating one of the annular members with respect to the other. It is also possible, however, to employ a single member similar to members 50$a$ and 50$b$ with coils distributed between the poles, the windings being so disposed that, when energized by direct current, a set of oppositely disposed south poles and a set of oppositely disposed north poles are produced at right angles to one another. By rotating such a device the direction of the resultant field with respect to the beams may be altered. By changing the amount of current through the coils, the intensity of the field may be regulated. This single device thus performs the same functions as does the preceding two-part skew and convergence corrector. These two forms of skew and convergence correctors are described and claimed in my copending application Serial No. 531,972 filed September 1, 1955.

Still another way of controlling the position of the region in which the video and indexing beams cross over is the internal convergence control illustrated in Figures 7$a$ and 7$b$. In Figure 7$a$ the end portion of the neck of a cathode ray tube, containing the electron gun for producing two independent electron beams, is shown. Located within the glass wall 60 of the neck, a tubular metal cathode sleeve 61, made of nickel or similar material, is disposed which is closed off at its forward end by a metal cap 62. The cap 62 may also be of nickel and may be welded to the sleeve 61. The cap 62 may have a flat, rounded, or dome shaped contour. If desired, the elements 61 and 62 may be formed from a single, extruded metal piece. The sleeve 61 and the cap 62 are inserted within a grid cylinder 63 having two diametrically opposed peripheral openings 80 and 81 through which a pair of flat metal control grid strips 64 and 65 are inserted. The strips 64 and 65 have right-angled bent back portions 66 and 67 respectively. Within each of the strips 64 and 65 are located apertures 68 and 69 which form the indexing and video beams respectively from the electrons emitted from the emissive surface 62. An annular mica spacer 70 is disposed adjacent the control grid strips 64 and 65 and in contact with inner surface of the grid cylinder 63. A perforated disc-like metallic shielding electrode 71, which lies in a plane parallel to the plane of the major portions of the strip 64 and 65, is insulated from the inner surface of the grid cylinder 63 by an annular mica spacer 72 and is in contact with the annular ring 70. It is also insulated and maintained in fixed position on its other side by another annular mica spacer 73 which is in contact with the end portion 74 of the grid cylinder 63. The shielding electrode 71 has two apertures 75 and 76 which are aligned with the apertures 68 and 69 of the grid strips 64 and 65. To the shielding electrode 71 a potential is applied which is substantially the same as the free space potential in the control grid-first anode region. This potential should be such that the pattern of the equipotential lines in the general region in which the electrode 71 is located is not substantially altered and consequently does not exert any substantial focussing or defocussing action on either of the beams. The apertures 78, 79, 90 and 91 in the electrode 71 assist in the manufacture of the electron gun by expediting the alignment of the electrode 71 with the other elements thereof.

The central unperforated portion 77 of electrode 71 also acts as an electrostatic shield to prevent cross modulation between the beams. In the absence of this central portion 77, the two beams may undesirably cross-modulate each other in certain types of circuits. Preferably the electrode 71 should be very close to the grid openings 68 and 69.

The grid cylinder 63 may be operated at a voltage between zero and 600 v. to provide a field lens which is operative to vary the position of the beam crossover region as a function of the voltage applied to the grid cylinder 63.

What I claim is:

1. Cathode ray apparatus comprising a screen composed of a plurality of substantially parallelly disposed, mutually spaced, electron-impingement-responsive elements, a source of a plurality of electron beams, means for causing said beams to cross over in a predetermined region, and a deflecting yoke responsive to energization to deflect said beams over said screen in two dimensions, the center of said yoke coinciding substantially with said cross-over region.

2. Apparatus according to claim 1 wherein said elements are disposed in a pincushion pattern.

3. Apparatus according to claim 1 wherein said elements comprise a plurality of fluorescent phosphor strips and a plurality of indexing strips, said indexing strips being coincident with selected ones of said phosphor strips.

4. Apparatus according to claim 1 further characterized in that the distance between said beams as they are deflected over said screen is small with respect to the length of said elements.

5. Apparatus according to claim 1 wherein the projections of said elements on a plane tangent to a point at the center of said screen conform substantially to the formula:

$$\alpha=\frac{1.11}{Z^2}XY$$

in which $\alpha$ is the angle in radians formed between the tangent to any of said projections at any point thereon and a first axis of said plane passing through said point of tangency, X is the distance in inches of said point from said first axis measured normal to said first axis, Y is the distance in inches measured parallel to said first axis of said point from a second axis of said plane perpendicular to said first axis and passing through said point of tangency, and Z is the distance in inches from the center of projection to the point of tangency of said plane.

6. Cathode ray apparatus comprising a source of a plurality of electron beams, means for causing said beams to cross over in a predetermined region, a deflecting yoke responsive to energization to deflect said beams in two dimensions, the center of said yoke coinciding substantially with said crossover region, and a screen disposed to be impinged upon by said beams as they are deflected, said screen comprising a plurality of electron-impingement-responsive strips, said strips being so arranged that, as said beams are deflected over said screen to impinge upon different ones of said strips, all of said beams simultaneously impinge upon the same strip.

7. The method of aligning a plural beam cathode ray tube assembly, said assembly including means for producing a plurality of electron beams, a fluorescent beam-intercepting structure, means for establishing the region in which said beams cross over within said tube, and a deflection yoke having a yoke center region, said method comprising the steps of energizing said yoke so as to produce two oppositely polarized magnetic fields of approximately equal strength which are transverse to the longitudinal axis of said tube, said fields being so disposed that they substantially cancel one another in the paraxial region, and varying the relative positions of said yoke and said crossover regions until all of the respective areas of impingement of said beams on said beam intercepting structure are at a minimum.

8. The method of aligning a plural beam cathode ray tube according to claim 7 wherein the relative positions of said yoke and crossover regions are varied by moving said yoke along said axis.

9. The method of aligning a plural beam cathode ray tube assembly, said assembly including means for producing a plurality of electron beams, a deflection yoke, means for varying the position of the region in which said beams cross over, and a fluorescent beam-intercepting structure, said method comprising the steps of: energizing said yoke so as to produce two oppositely polarized magnetic fields of approximately equal strength which are transverse to the longitudinal axis of said tube, said fields being so disposed that they substantially cancel one another in the paraxial region, and varying the position of said crossover region until all of the respective areas of impingement of said beams on said beam intercepting structure are at a minimum.

10. A beam intercepting structure for a cathode ray tube comprising a plurality of mutually spaced, electron-impingement-responsive strip-like elements disposed on a supporting surface, said elements being arranged to extend generally in a first direction and being spaced from one another in a second direction perpendicular to said first direction, the projections of said elements on a plane tangent to a point at the center of said screen conforming substantially to the formula:

$$\alpha=\frac{1.11}{Z^2}XY$$

where $\alpha$ is the angle in radians formed between the tangent to any of said projections at any point thereon and a first axis of said plane passing through said point of tangency, X is the distance in inches of said point from said first axis measured normal to said first axis, Y is the distance of said point in inches measured parallel to said axis from a second axis of said plane perpendicular to said first axis and passing through said point of tangency, and Z is the distance in inches from the center of projection to the point of tangency of said plane.

References Cited in the file of this patent

UNITED STATES PATENTS

| | | |
|---|---|---|
| 2,203,734 | Lubszynski | June 11, 1940 |
| 2,457,175 | Parker | Dec. 28, 1948 |
| 2,671,129 | Moore | Mar. 2, 1954 |
| 2,675,501 | Friend | Apr. 13, 1954 |